Dec. 28, 1937.　　　C. E. LEHMAN　　　2,103,425
FAUCET ATTACHMENT
Filed Dec. 18, 1936　　　2 Sheets-Sheet 1
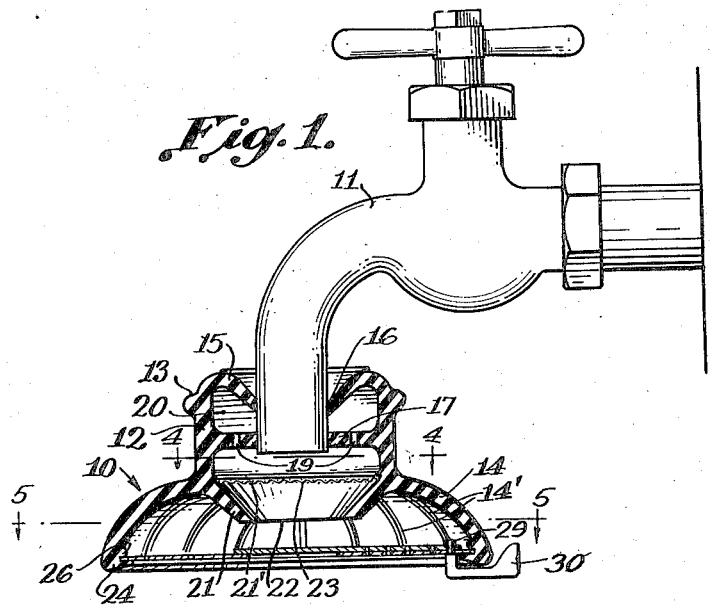
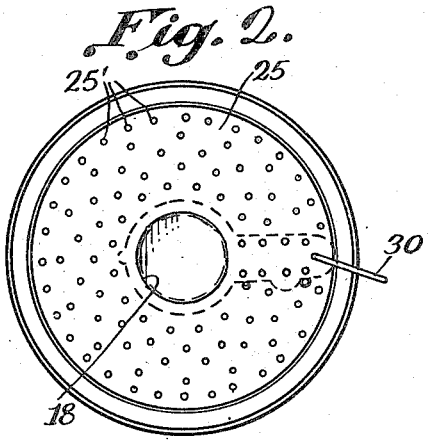
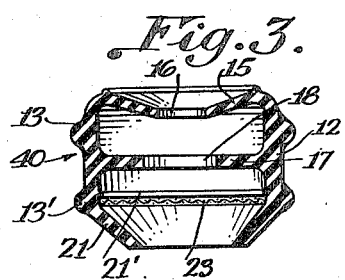
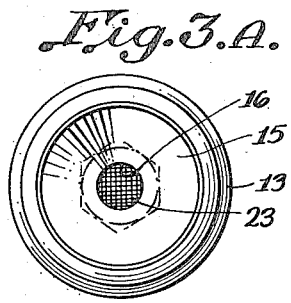
INVENTOR.
CARL E. LEHMAN
BY Miller & Miller
ATTORNEYS.

Dec. 28, 1937.　　C. E. LEHMAN　　2,103,425
FAUCET ATTACHMENT
Filed Dec. 18, 1936　　2 Sheets-Sheet 2
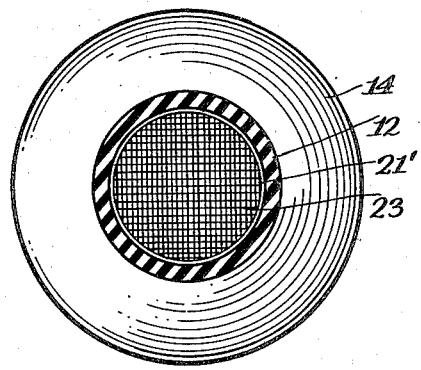
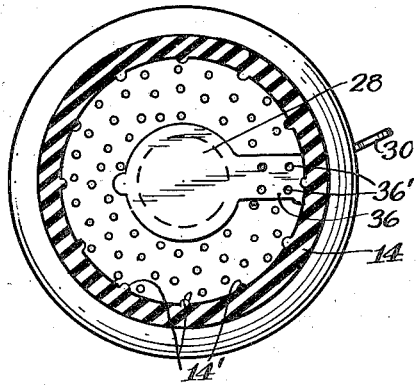
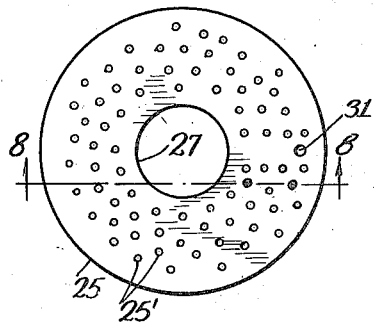
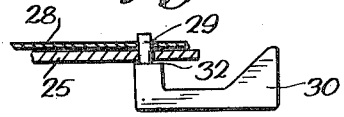
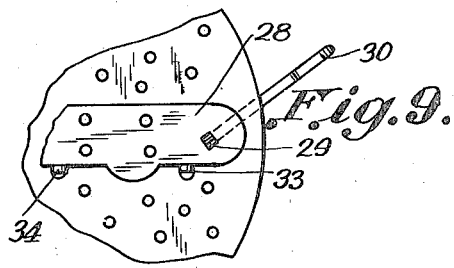
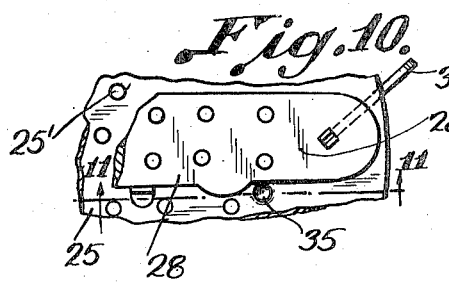
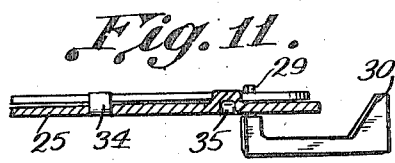
INVENTOR.
CARL E. LEHMAN.
BY Miller & Miller
ATTORNEYS.

Patented Dec. 28, 1937

2,103,425

UNITED STATES PATENT OFFICE 2,103,425

FAUCET ATTACHMENT

Carl E. Lehman, Chicago, Ill.

Application December 18, 1936, Serial No. 116,631

6 Claims. (Cl. 210—84)

This invention relates to a faucet attachment, and has for an object to provide an improved faucet attachment wherein the same size attachment may be used with various sizes of faucets. This application is a continuation in part of an application filed July 22, 1935, Serial Number 32,599 and allowed September 19, 1936.

The faucet attachment of this invention has several important features and advantages. When used it can make either a regular straight stream of water or a spray of water as desired. It serves to filter the water and at the same time acts as an anti-splash device.

Further, it acts as a bumper to prevent breakage of dishes or glasses when the same are accidently struck against the faucet while being washed or used.

The same size of faucet attachment of this invention may be used for various sizes of faucets. Thus, a single size will fit the faucets varying in size between one-half inch in diameter to one inch in diameter. Although the same size attachment may be used on different sizes of faucets, yet the attachment of this invention will firmly attach itself to the faucet in a rigid manner, being non-wobbly irrespective of whether the faucet is the minimum or maximum size that can be used with the same size of attachment.

As a further feature of this invention, this faucet attachment is made principally of soft molded rubber, only the spray forming feature being necessarily made of a harder material, such as metal or hard rubber or hard compositional matter.

A still further feature of this invention lies in providing integral reinforcing ribs in the body of the faucet attachment, some of which serve to assist in retaining its shape in use under pressure. One of the reinforcing ribs serves an additional purpose of facilitating assembly of the faucet attachment.

A still further feature of this invention is the provision of a spray plate which may be inexpensively manufactured and assembled, the process of manufacturing the spray plate, however, being covered in a separate application filed Dec. 16, 1936, Ser. No. 116,630.

With the foregoing and other objects in view, as will hereinafter become apparent, this invention comprises the constructions, combinations and arrangements of parts hereinafter set forth, disclosed and shown on the accompanying drawings. In these drawings:

Fig. 1 is a vertical sectional view of the faucet attachment in position on a faucet.

Fig. 2 is a bottom plan view of Fig. 1.

Fig. 3 is a vertical sectional view of a modified form of faucet attachment.

Fig. 3A is a top plan view of the form shown on Fig. 3.

Fig. 4 is a sectional view on line 4—4 of Fig. 1.

Fig. 5 is a sectional view on line 5—5 of Fig. 1.

Fig. 6 is a plan view of the spray plate.

Fig. 7 is a sectional view through the spray plate and valve door with the valve operating handle secured in position.

Fig. 8 is a sectional view on line 8—8 of Fig. 6 showing a sheared type of valve door stop.

Fig. 9 is a fragmentary top plan view of the valve door and spray plate.

Fig. 10 is a fragmentary view of a spray plate and valve door having a drawn and sheared type of valve stop.

Fig. 11 is a sectional view on line 11—11 of Fig. 10.

There is shown at 10 the faucet attachment of this invention as applied to an ordinary conventional faucet 11. This faucet attachment 10 is made principally of molded soft rubber, and comprises a cylindrical neck 12 about which is formed a reinforcing thickened rib 13. Integrally depending from the cylindrical neck 12 is a flared skirt 14, provided with internal reinforcing ribs 14'.

The top of the cylindrical neck 12 is provided with an internally extending funnel shaped angular flange 15 which tapers in thickness somewhat toward an aperture 16 which extends about the nozzle of the faucet 11. This aperture 16 in this tapered flange 15 is adapted to stretch to the diameter of the nozzle faucet, the aperture 16 being initially somewhat smaller than the smallest diameter of the faucet to which the attachment is to be attached, and the greater the diameter of the nozzle of the faucet, the greater will be the angle to which the flange 15 will bend to permit the attachment to be placed in position.

Spaced below this flange 15 is a second internally extending flange 17 which has a perfectly round opening 18 therethrough which is likewise adapted to fit about the nozzle of the faucet 11, as shown in Figure 1. In the size of faucet attachment which is to be used on faucet nozzles varying between one-half and one inch in diameter, this opening 18 will preferably be five-eighths of an inch in diameter. As shown in Fig. 1, this flange 17 may be provided with several apertures 19 therethrough, thereby allowing some of the water pressure to enter into the chamber 20 formed between the flanges 15 and 17, the water pressure thus serving to press the flange 15 more tightly against the faucet 11. The lower flange 17 extends in a direction normal to the axis of the cylinder 12 and acts as a brace and prevents the attachment from wobbling on the faucet.

In use, however, it has been found practical to omit the aperature 19 and to make the flange aperture 18 circular in outline, there usually being sufficient pressure below the end of the faucet to creep by the faucet 11 and press against the bottom of the flange 15 to press it against the faucet. The pressure in the chamber 20 with the attachment made in this manner is less than the pressure below the flange 17 and this reduced pressure thus serving to press the flange 15 more tightly against the faucet, at the same time preventing leakage past the flange 15.

Within the cylindrical neck 12 below the flange 17, there is provided another internally extending funnel shaped flange 21 having an aperture 22 through which the water passes. As shown, this flange 21 will, preferably, but not necessarily, be at or adjacent the joint between the cylindrical neck 12 and the flared skirt 14 and may even extend from the insides of the skirt 14, so long as the diameter of the aperture 22 in flange 21 is less than the internal diameter of the cylindrical neck 12.

Between the funnel shaped flange 21 and the flange 17, there is provided an internal horizontal rib 21'.

Between the rib 21' and the funnel shaped flange 21 is placed a filter disc 23, this rib 21' serving to limit the upward movement of the filter disc 23. This is especially useful in assembling the disc 23 within the faucet attachment for the funnel shaped flange 21 is stretched to permit the disc 23 to pass it and the rib 21' stops it and holds it in proper position.

Integrally extending from the inside of the flared skirt 14 are a plurality of vertical ribs 14' serving to reinforce the skirt 14 and to maintain its shape under pressure to which it will be subjected in use. Below the ribs 14' the skirt 14 ends in an internally extending lip 24 which acts as a support for the perforated strainer disc or spray plate 25 spaced just above the lip 24. About the inner circumference of the skirt 14 are a plurality of nibs 26 which serve to assist the lip 24 in holding the disc or plate 25 in proper position. The disc 25 is shown with a plurality of perforations 25', five rows thereof being shown, but obviously more or less may be provided. These perforations may vary not only in number but in size, but in actual use it has been found perforations which are .035 inches in diameter and somewhat greater in number than shown for convenience of illustration, Fig. 2, perform most satisfactorily.

At the center, the disc 25 is provided with a large opening 27, the diameter preferably at least equal to the diameter of a faucet on which it is to be attached.

A valve door 28 of size sufficient to close the opening 27 is pivoted to the upper side of the disc by means of a neck 29 extending from a handle 30 through an opening in the spray plate or disc 25. This neck will be rectangular in cross-section and a special perforation 31 is provided in the spray plate 25, having a diameter substantially equal to its diagonal. The valve door 28 is provided with a rectangular opening substantially equal in size to the size of the neck 29, the neck 29 being joined to the handle 30 by a shoulder 32. In assembling the valve door 28 on the spray plate 25, the neck 29 is inserted through the perforation 31 in the plate 25 and through the rectangular opening in the valve door 28 and held in position on an assembly framework. A die hitting down on the upper edge of the neck 29 forms a longitudinal split extending a very slight amount into the neck, but sufficient to pean it over a bit and cause the opposite sides of the neck to fasten tightly against the opposite sides of the rectangular opening in the valve door 28 and thus fasten the valve door 28 firmly to the handle 30. At the same time, the neck is secured sufficiently tight to the valve door 28 to prevent leakage therethrough. Means are provided for holding the valve door 28 in position to close the opening 27 and consist of one or more stop members 33 and 34 provided in the spray plate 25. As shown in Fig. 9, these stop members may be provided in the manufacture of the plate 25 by causing a selected one or more of the perforations 25' to be only partially, instead of completely, sheared through in the manner shown in the accompanying application filed therewith. The stop member 33, it will be observed, is close to the position of the handle neck 29 and if desired the stop member 34 may be omitted, serving only to reinforce the operation of the stop member 33.

Instead of forming these stop members by partial shearing through the plate 25, they may be formed by being drawn rather than sheared, thus as shown in Figs. 10 and 11, the stop member 35 is drawn through the plate 25 but is not sheared therefrom at all, yet it serves to limit the movement of the valve door 28 in one direction; the movement of the valve door in the other direction being limited by the flared skirt 14.

As will be observed, the valve door 28 is imperforate where it is intended to extend over the opening 27. At the same time, however, it is perforated wherever its handle or stem 36 will overlie perforations 25' in the plate 25 and these perforations 36' will, preferably, be of a slightly larger diameter than those of the perforations 25', so that regularity of the stream will not be effected thereby.

In operation, the faucet attachment 10 is forced over the nozzle of the faucet 11 until the nozzle extends through the perforation 18 in the flange 17. The flanges 15 and 17 thus in effect form a stuffing box with some back pressure from the faucet leaking through the perforation 18 of the chamber 20; this back pressure then presses against the lower side of the angular flange 15 thus pressing it against the faucet 11 and preventing any leakage thereby. The water from the faucet passes through the strainer 23 which may make the size of the stream irregular. It then strikes the funnel shaped flange 21 and becomes a regular stream as it passes through the opening 22 in the funnel 21.

If the valve door 28 is in open position away from the aperture 27, it continues on in this regular stream through the opening 27.

If the valve door 28 is closed, closing the opening 27, then the water strikes the upper side of valve door 28 and is deflected outwardly to the inside of the flared skirt 14, which in turn deflects it downwardly and through the perforations 25' in the spray plate or disc 25 to provide a stream or shower effect. To shift from a spray or shower effect to a stream effect, it is only necessary to move the handle 30 from one extreme to the other, thereby moving the valve door from open to closed position and vice versa.

At 40 a faucet attachment is shown similar to that in the preferred form, except that the flared skirt 14 and the spray plate and valve door are completely omitted. In this form, the funnel 15 has the aperture 16 extending over the nozzle of a faucet. An angular plate 17 extends inwardly from its cylindrical neck 12 and is provided with aperture 18 for extending about the faucet nozzle. The same rib 21' serves for limiting the upward movement of the screen 23. The same funnel shaped flange 21 causes a regular stream to issue therefrom. A reinforcing thickened rib 13 is provided and in place of the flared skirt 14 a lower reinforcing rib 13' is also provided. This attachment 40 provides only a stream producing water straining attachment, and also serves to act as a cushioning member to prevent breaking dishes against the faucet nozzle.

The novel features and the operations of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. A faucet attachment comprising an all-rubber casing, said casing comprising a cylindrical portion, a flared skirt portion integrally joined to said cylindrical portion at one end thereof, an internal angularly extending apertured flange at the other end of said cylindrical portion, a funnel-shaped internally extending apertured flange integrally joined to said casing internally thereof, the diameter of the aperture in said last-mentioned funnel shaped flange being less than the diameter of said cylindrical portion, and another flange internally extending in said cylindrical portion between said first mentioned angular flange and said second-mentioned funnel-shaped flange, said additional flange extending in a direction normal to the axis of the cylinder and being centrally apertured to extend over the faucet.

2. A faucet attachment comprising an all-rubber casing, said casing comprising a cylindrical portion, an internal angularly extending apertured flange at one end of said cylindrical portion, and a second flange internally extending in said cylindrical portion below said angularly extending apertured flange, said second flange extending in a direction normal to the axis of the cylinder and being centrally apertured whereby both said flanges may extend over the faucet to provide a stuffing box to hold said attachment over the faucet and prevent leakage above said first-mentioned flange.

3. A faucet attachment comprising an all-rubber casing, said casing comprising a cylindrical portion, a flared skirt portion integrally joined to said cylindrical portion at one end thereof, an internal angularly extending apertured flange at the other end of said cylindrical portion, a funnel-shaped internally extending apertured flange integrally joined to said casing at the joint between said cylindrical portion and said flared skirt portion, and an apertured filter member, said filter member resting within said cylindrical portion against said funnel-shaped flange, another flange internally extending in said cylindrical portion between said first-mentioned angular flange and said second-mentioned funnel-shaped flange, said additional flange being centrally apertured to extend over the faucet and being additionally apertured to permit back-pressure to enter the chamber between said additional flange and said angular flange to cause said angular flange to grip the faucet for tightening.

4. A faucet attachment comprising an all-rubber casing, said casing comprising a cylindrical portion, a flared skirt portion integrally joined to said cylindrical portion at one end thereof, an internal, angularly extending apertured flange at the other end of said cylindrical portion, a funnel-shaped internally extending apertured flange integrally joined to said casing adjacent the joint between said cylindrical portion and said flared skirt portion, another flange internally extending in said cylindrical portion between said first-mentioned angular flange and said second-mentioned funnel-shaped flange, said additional flange extending in a direction normal to the axis of the cylinder and being centrally apertured to extend over the faucet, a filter member within said cylindrical member located below said additional flange and above said funnel-shaped flange and an internally extending lip on the bottom of said flared skirt portion, nibs on said skirt portion adjacent said lip, a perforated spray member within said flared skirt portion resting below said nibs and against said lip.

5. A faucet attachment comprising an all-rubber casing, said casing comprising a cylindrical portion, a flared skirt portion integrally joined to said cylindrical portion at one end thereof, an internal angularly extending apertured flange at the other end of said cylindrical portion, a funnel-shaped internally extending apertured flange integrally joined to said casing adjacent the joint between said cylindrical portion and said flared skirt portion, and a filter member, said filter member resting within said cylindrical portion above said funnel-shaped flange, another flange internally extending in said cylindrical portion between said first-mentioned angular flange and said second-mentioned funnel-shaped flange, said additional flange extending in a direction normal to the axis of the cylinder and being centrally apertured to extend over the faucet, said filter member being located below said additional flange, said flared skirt being provided with a plurality of integrally, internally, extending vertical strengthening ribs.

6. A faucet attachment comprising an all-rubber casing, said casing comprising a cylindrical portion, an internal angularly extending apertured flange at one end of said cylindrical portion, a funnel-shaped internally extending apertured flange integrally joined to said casing adjacent the other end thereof, another flange internally extending in said cylindrical portion between said first-mentioned angular flange and said second-mentioned funnel-shaped flange, said additional flange extending in a direction normal to the axis of the cylinder and being centrally apertured to extend over the faucet, a horizontal internally extending rib between said middle flange and said second-mentioned flange and a filter member resting within said cylindrical portion between said funnel-shaped flange and said horizontal rib.

CARL E. LEHMAN.